(12) United States Patent
Allen et al.

(10) Patent No.: US 10,789,362 B2
(45) Date of Patent: Sep. 29, 2020

(54) TAINT ANALYSIS WITH ACCESS PATHS

(71) Applicant: Oracle International Corporation, Redwood Shores, CA (US)

(72) Inventors: Nicholas Allen, Brisbane (AU); Francois Gauthier, Brisbane (AU); Alexander Jordan, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 119 days.

(21) Appl. No.: 16/050,160

(22) Filed: Jul. 31, 2018

(65) Prior Publication Data

US 2020/0042706 A1 Feb. 6, 2020

(51) Int. Cl.
| | |
|---|---|
| *G06F 9/44* | (2018.01) |
| *G06F 21/56* | (2013.01) |
| *G06F 8/10* | (2018.01) |
| *G06F 21/55* | (2013.01) |
| *H04L 29/06* | (2006.01) |

(52) U.S. Cl.
CPC .............. *G06F 21/566* (2013.01); *G06F 8/10* (2013.01); *G06F 21/554* (2013.01); *H04L 63/1466* (2013.01)

(58) Field of Classification Search
CPC ... G06F 8/20; G06F 8/433; G06F 8/10; G06F 8/434; G06F 11/3676; G06F 11/362; G06F 11/3608; G06F 11/366; G06F 11/3664; G06F 8/43; G06F 11/3452
USPC .................................................. 717/132, 156
See application file for complete search history.

(56) References Cited

U.S. PATENT DOCUMENTS

2013/0031531 A1* 1/2013 Keynes .................... G06F 8/74
717/126

OTHER PUBLICATIONS

Steven Arzt et al., "FlowDroid: Precise Context, Flow, Field, Object-sensitive and Lifecycle-aware Taint Analysis for Android Apps"; PLDI; Edinburgh, United Kingdom; Jun. 9-11, 2014 (11 pages).
Ron Cytron et al., "An Efficient Method of Computing Static Single Assignment Form"; Proceedings of the 16th Symposium on Principles of Programming Languages—POPL '89, pp. 25-35, 1989 (11 pages).
Cristina Cifuentes et al, "Transitioning Parfait into a Development Tool"; IEEE Computer and Reliability Societies; IEEE Security & Privacy; pp. 16-23; May 2012 (8 pages).
Erich Gamma et al., "Design Patterns: Elements of Reusable Object-Oriented Software"; Addison-Wesley Longman Publishing Co., Inc.; Boston, MA, USA, 1995 (417 pages).
V. Benjamin Livshits et al., "Finding Security Vulnerabilities in Java Applications with Static Analysis"; 14th USENIX Security Symposium; pp. 271-286; 2005 (16 pages).

(Continued)

*Primary Examiner* — Chuck O Kendall
(74) *Attorney, Agent, or Firm* — Ferguson Braswell Fraser Kubasta PC

(57) ABSTRACT

A method that involves generating, for source code, a set of nodes for a set of statements comprising a first statement and a second statement, wherein each node of the set of nodes comprises a dataflow fact and a statement of the set of statements; identifying a source node and a sink node of the set of nodes; determining that the source node is backward reachable from the sink node by analyzing an incoming access path; and, in response to the determination, identifying a potential taint flow from the source node to the sink node.

18 Claims, 6 Drawing Sheets

(56) References Cited

OTHER PUBLICATIONS

Nomair A. Naeem et al, "Practical Extensions to the IFDS Algorithm"; University of Waterloo, Canada; 2010 (20 pages).
OWASP Top 10 Project: <https://www.owasp.org/index.php/Category:OWASP_Top_Ten_Project>; Accessed Dec. 19, 2017 (4 pages).
Thomas Reps et al., "Precise Interprocedural Dataflow Analysis via Graph Reachability"; In Proceedings of the 22nd ACM Symposium on Principles of Programming Languages; 1995 (13 pages).
Thomas Reps et al., "Interprocedural Dataflow Analysis via Graph Reachability"; Technical Report; Datalogisk Institut, University of Copenhagen; Copenhagen, Denmark; 1994 (51 pages).
Johannes Späth et al., "Boomerang: Demand-Driven Flow- and Context-Sensitive Pointer Analysis for Java"; 30th European Conference on Object-Oriented Programming (ECOOP); 2016 (25 pages).
Omer Tripp et al., "Andromeda: Accurate and Scalable Security Analysis of Web Applications"; 16th International Conference on Fundamental Approaches to Software Engineering (FASE); 2013 (16 pages).
Omer Tripp et al., "TAJ: Effective Taint Analysis of Web Applications"; PLDI; Dublin, Ireland; Jun. 15-20, 2009 (11 pages).

\* cited by examiner

| Line | Code | step |
|---|---|---|
| 1 | public class Box { | |
| 2 | private string f; | |
| 3 | | |
| 4 | public void put(string str) { | // 14. summary(this.f) = {arg0} |
| 5 | this.f = str; | // 13. {str} |
| 6 | } | // 12. {this.f} |
| 7 | | |
| 8 | | |
| 9 | public string get() { | // 6. summary(<ret>) = {this.f} |
| 10 | string str = this.f; | // 5. {this.f} |
| 11 | return str; | // 4. {str} |
| 12 | } | // 3. {<ret>} |
| 13 | } | |
| 14 | | |
| 15 | public static Box copy(Box box) { | // 19. summary(<ret>.f) = {arg0.f} |
| 16 | Box cpy = new Box(); | // 18. {box.f} |
| 17 | | // 17. {box.f} |
| 18 | string data = box.get(); | // 16. reuse summary(Box.get, <ret>) {box.f} |
| 19 | | // 15. {data} |
| 20 | cpy.put(data); | // 11. compute summary(Box.put, this.f) {data} |
| 21 | return cpy; | // 10. {cpy.f} |
| 22 | } | // 9. {<ret>.f} |
| 23 | | |
| 24 | public static void foo() { | // 24. 0 (null fact) |
| 25 | string tainted = getTainted(); | // 23. {tainted} |
| 26 | Box box1 = new Box(); | // 22. {tainted} |
| 27 | | |
| 28 | box1.put(tainted); | // 21. reuse summary(Box.put, this.f) {tainted} |
| 29 | | // 20. {box1.f} |
| 30 | Box box2 = copy(box1); | // 8. compute summary(copy, <ret>.f) {box1.f} |
| 31 | | // 7. {box2.f} |
| 32 | string boxData = box2.get(); | // 2. compute summary(Box.get, <ret>) {box2.f} |
| 33 | sink(boxData); | // 1. {boxData} |
| 34 | } | |

FIG. 4A

| Line | Graphs | | | | | | | | | | | | | | |
|---|---|---|---|---|---|---|---|---|---|---|---|---|---|---|---|
| 1 | | | | | | | | | | | | | | | |
| 2 | | | | | | | | | | | | | | | |
| 3 | 0 | this.f | str | arg0 | | | | | | | | | | | |
| 4 | | | | o | | | | | | | | | | | |
| 5 | | | o | o | | | | | | | | | | | |
| 6 | | o | o | o | | | | | | | | | | | |
| 7 | | | | | | | | | | | | | | | |
| 8 | | 0 | <ret> | str | this.f | | | | | | | | | | |
| 9 | | | | | o | | | | | | | | | | |
| 10 | | | o | o | o | | | | | | | | | | |
| 11 | | | o | o | o | | | | | | | | | | |
| 12 | | | o | o | o | | | | | | | | | | |
| 13 | | | | | | | | | | | | | | | |
| 14 | | 0 | <ret>.f | cpy.f | data | box.f | arg0.f | | | | | | | | |
| 15 | | | | | | | o | | | | | | | | |
| 16 | | | o | o | o | o | o | | | | | | | | |
| 17 | | | o | o | o | o | o | | | | | | | | |
| 18 | | | o | o | o | o | o | | | | | | | | |
| 19 | | | o | o | o | o | o | | | | | | | | |
| 20 | | | o | o | o | o | o | | | | | | | | |
| 21 | | | o | o | o | o | o | | | | | | | | |
| 22 | | | o | o | o | o | o | | | | | | | | |
| 23 | | | | | | | | | | | | | | | |
| 24 | | 0 | boxData | box2.f | box1.f | tainted | | | | | | | | | |
| 25 | | o | | | | | | | | | | | | | |
| 26 | | | o | o | o | o | | | | | | | | | |
| 27 | | | o | o | o | o | | | | | | | | | |
| 28 | | | o | o | o | o | | | | | | | | | |
| 29 | | | o | o | o | o | | | | | | | | | |
| 30 | | | o | o | o | o | | | | | | | | | |
| 31 | | | o | o | o | o | | | | | | | | | |
| 32 | | | o | o | o | o | | | | | | | | | |
| 33 | | | o | | | | | | | | | | | | |
| 34 | | | | | | | | | | | | | | | |

TAINT ANALYSIS WITH ACCESS PATHS

BACKGROUND

Data driven applications in computer networks are vulnerable to injection attacks where unvalidated data can flow to sensitive operations. Examples include structured query language (SQL) injection attacks and cross-site scripting (XSS) attacks that can allow an attacker to take unauthorized control of the systems susceptible to unvalidated dataflows.

To prevent unvalidated dataflows, the source code of the applications can be analyzed for the possibility of unvalidated dataflows within the application. Existing approaches for analyzing unvalidated dataflows, referred to as taint analysis, are computationally expensive (e.g., based on a comprehensive alias analysis) and lack scalability.

SUMMARY

In general, in one or more aspects, the invention relates to a method that involves generating, for source code, a set of nodes for a set of statements comprising a first statement and a second statement, wherein each node of the set of nodes comprises a dataflow fact and a statement of the set of statements; identifying a source node and a sink node of the set of nodes; determining that the source node is backward reachable from the sink node by analyzing an incoming access path; and, in response to the determination, identifying a potential taint flow from the source node to the sink node.

In general, in one or more aspects, the invention relates to a system that comprises: a memory, coupled to a processor, comprising a repository comprising: source code comprising a set of statements comprising a first statement and a second statement; and a supergraph comprising a set of nodes each comprising a dataflow fact and a statement of the set of statements; and an access path propagator executing on the processor and using the memory, configured to: generate the set of nodes for the set of statements; identify a source node and a sink node of the set of nodes; determine that the source node is backward reachable from the sink node by analyzing an incoming access path; and in response to the determination, identify a potential taint flow from the source node to the sink node.

In general, in one or more aspects, the invention relates to a non-transitory computer readable medium that comprises computer readable program code for: generating, for source code, a set of nodes for a set of statements comprising a first statement and a second statement, wherein each node of the set of nodes comprises a dataflow fact and a statement of the set of statements; identifying a source node and a sink node of the set of nodes; determining that the source node is backward reachable from the sink node by analyzing an incoming access path; and in response to the determination, identifying a potential taint flow from the source node to the sink node.

Other aspects of the invention will be apparent from the following description and the appended claims.

BRIEF DESCRIPTION OF DRAWINGS

FIGS. 4A and 4B show an example in accordance with one or more embodiments of the present disclosure.

DETAILED DESCRIPTION

Figure 1:
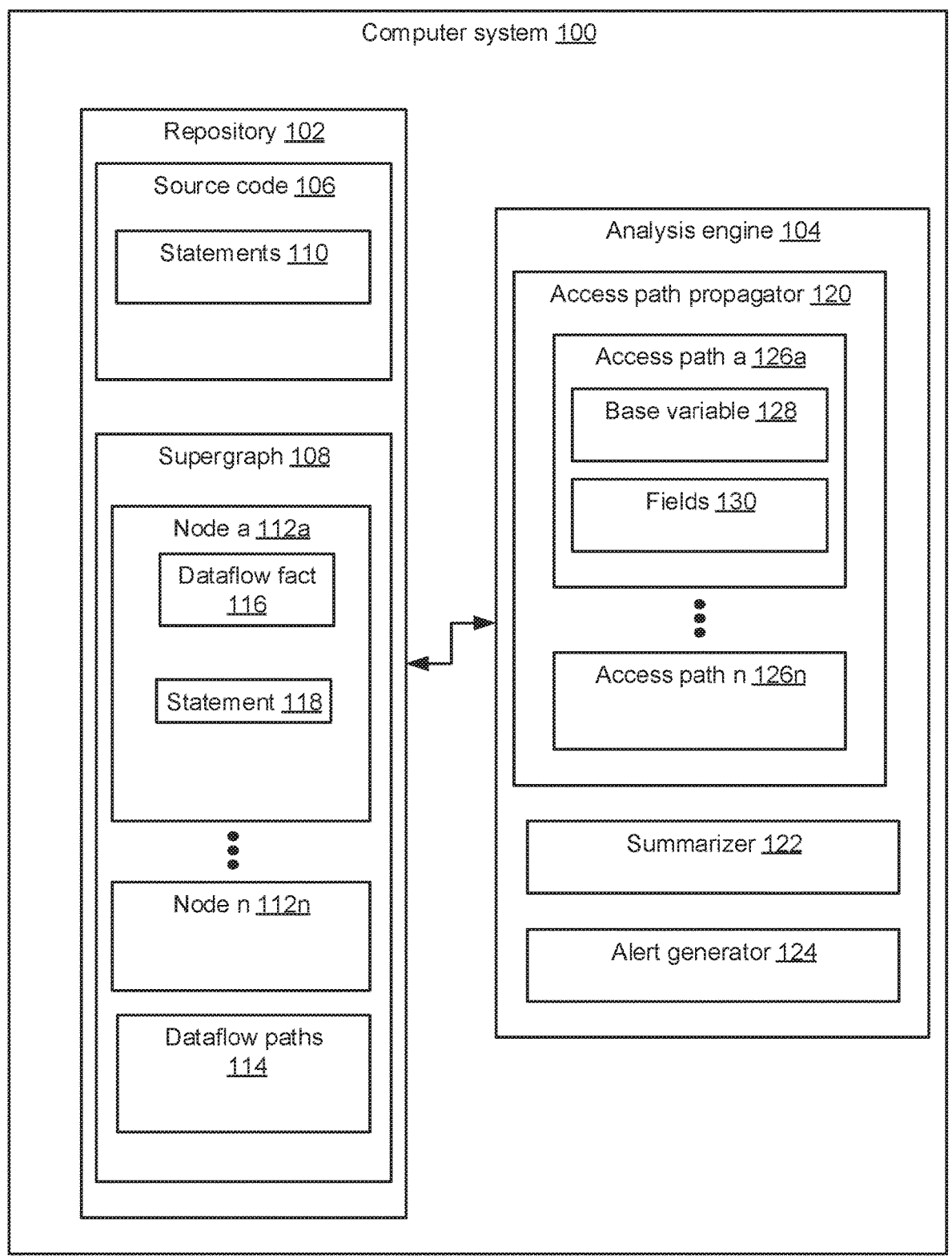
FIG. 1 shows a system in accordance with one or more embodiments of the present disclosure.

Specific embodiments of the disclosure will now be described in detail with reference to the accompanying figures. Like elements in the various figures are denoted by like reference numerals for consistency.

In the following detailed description of embodiments, numerous specific details are set forth in order to provide a more thorough understanding of the disclosure. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention allow for an efficient and scalable taint analysis of source code. Potentially tainted access paths derived from sink statements may be propagated while traversing a supergraph based on a control flow graph for the source code until a source statement is reached that is associated with an access path that matches an access path propagated from the sink statement. Each access path may include a base variable and a list of fields. In one or more embodiments, the supergraph is incrementally constructed, on demand, as statements in the source code are analyzed. When the source statement corresponds to a potential taint source (e.g., where an input from a user or external source is received), then a potential security flaw may exist in the source code, and a security alert may be generated.

FIG. 1 shows a diagram of a computing system (100) in accordance with one or more embodiments of the invention. The computing system (100) may correspond to the computing system shown in FIGS. 5A and 5B. In particular, the type, hardware, and computer readable medium for the computing system (100) is presented in reference to FIGS. 5A and 5B. FIG. 1 shows a component diagram of the computing system (100). The computing system (100) includes a repository (102) and an analysis engine (104). In one or more embodiments, one or more of the components and modules shown in FIG. 1 may be omitted, repeated, and/or altered as shown from FIG. 1. Accordingly, the scope of the present disclosure should not be considered limited to the specific arrangement of components and modules shown in FIG. 1.

The repository (102) is a combination of programs and data that provide access to structured data. In one or more embodiments, the repository (102) includes programs for version control, source code management, and source code development. Data within the repository (102) includes the source code (106) and the supergraph (108).

The source code (106) is a collection of computer instructions. In one or more embodiments, the computer instructions are written using a human-readable programming or scripting language in plain text files. The source code can be transformed by compilers, assemblers, linkers, or interpreters into statements (110).

The statements (110) are representations of the source code (106) that can be source code of a high-level language, scripting language code, assembly language code, object code, byte code, and/or machine code. In one or more embodiments, the statements (110) include multiple types of statements including load statements and store statements. Load statements can load data from a memory of the computer system (100) into a register of a processor of the computer system (100). Store statements can store data from a register to the memory. The set of load statements include sink statements that are vulnerable to tainted data. Sink statements include function calls that operate on possibly tainted data, an example of which includes calls to execute structured query language (SQL) queries. The set of source statements include source statements that may provide tainted data, examples of which include function calls that get data provided by external users or systems. The tainted data can include malicious data that when utilized by the computer system (100) can allow for inappropriate access to and control of the computer system (100), such as through a SQL injection attack or a cross-site scripting attack.

The supergraph (108) is a data structure that includes a set of nodes (112a to 112n) and a set of dataflow paths (114). The supergraph (108) graphs the set of nodes (112a to 112n) to the statements (110) of the source code (106). In one or more embodiments, the supergraph (108) is an exploded supergraph, where the nodes of an control flow graph (CFG) are exploded into as many nodes as there are dataflow facts (116) to form the set of nodes (112a to 112n) in the supergraph (108).

Each node (112) may be associated with a dataflow fact (116) and a statement (118). The dataflow fact (116) of the node (112a) may correspond to a variable that is referenced in the statement (118). The statement (118) is one of the set of statements (110) of the source code (106). The nodes (112a to 112n) include source nodes and sink nodes. Source nodes are nodes in the supergraph (108) that act as a sources of tainted data. The statement of a source node is referred to as a source statement. Sink nodes in the supergraph (108) act as sinks of tainted data. The statement of a sink node is referred to as a sink statement.

Each of the dataflow paths (114) is associated with a set of nodes (112a to 112n) each having a corresponding statement (118). Each statement (118) associated with the dataflow path (114) may be executed during operation of the program defined by the source code (106). In one or more embodiments, when a dataflow path (114) includes a first node (112a) identified as a source node, and a second node (112n) identified as a sink node, the dataflow path is a tainted dataflow path. Each dataflow path can include a number of store statements, load statements, assignment statements, function calls, and function returns.

The analysis engine (104) includes a set of modules, programs, and data (e.g., the access path propagator (120), the summarizer (122), and the alert generator (124)) that, when executed, perform a taint analysis on the source code (106) in the repository (102). The analysis engine (104) may be executed on one or more physical or virtual computer systems, such as those described with respect to FIGS. 5A and 5B. In one or more embodiments, the analysis engine (104) is executed either on a server computer system that is controlled by a remote developer computer system or directly on the developer computer system.

The access path propagator (120) is a set of modules, programs, and data that may operate to propagate access paths (126a through 126n) through the supergraph (108) as part of a taint analysis. In one or more embodiments, the access paths (126a through 126n) are stored in the repository (102). Each access path (126a) includes a base variable (128) and a list of fields (130). For example, an access path (126a) may be written as $b.f_1.f_2 \ldots f_n$ where b is the base variable (128) and $f_1.f_2 \ldots f_n$ are the fields (130). The base variable (128) identifies an instance of an object or class of the source code (106). The list of fields (130) identifies the fields used to identify and access data within the object starting from the base variable (128). Access paths related to a store statement are referred to as store access paths and access paths related to a load statement are referred to as load access paths. A prefix of an access path (126a) includes the base variable (128) and zero or more of the fields (130). Continuing the example above, $b.f_1.f_2$ is a prefix of the access path $b.f_1.f_2 \ldots f_n$.

The summarizer (122) is a set of modules, programs, and data that operate to summarize the dataflow for interprocedural function calls. The summarizer (122) accesses the statements (110) being analyzed by the analysis engine (104) to generate a summary for an inter-procedural function call. The summary is a mapping of the output of an interprocedural function call of a statement (110) in the source code (106) to the set of variables that are used to form the output and through which tainted data may flow into the output. From the summary, the access path that is assigned to the output of the inter-procedural function call can be mapped to the access paths of the variables that can pass tainted data to the output of the function call.

The alert generator (124) is a set of modules, programs, and data that operate to generate alerts. In one or more embodiments, the alerts are generated when a taint analysis identifies a set of statements (110) in the source code (106) that correspond to a tainted dataflow path (114).

Figure 2:
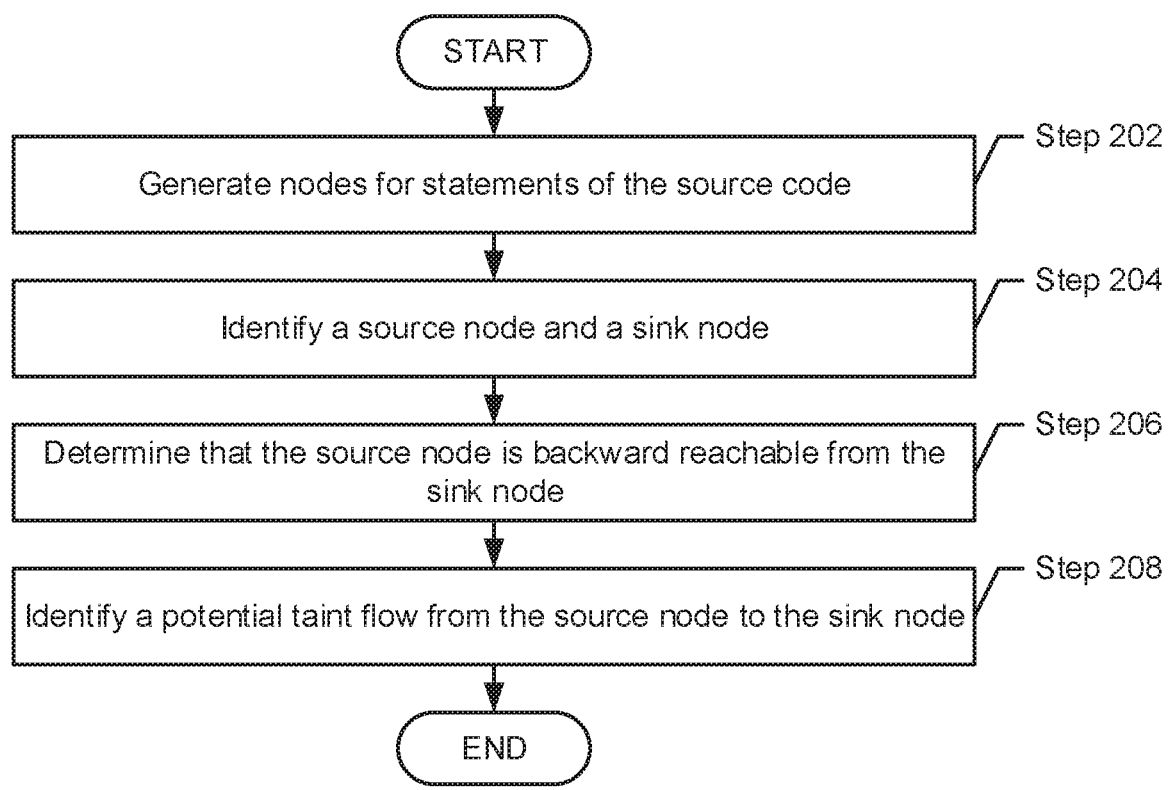
FIG. 2 shows a method for taint analysis in accordance with one or more embodiments of the present disclosure.

FIG. 2 shows a flowchart in accordance with one or more embodiments of the present disclosure. The flowchart of FIG. 2 depicts a process for performing taint analysis on source code. The process can be implemented to operate on computer system (100) of FIG. 1. In one or more embodiments, one or more of the steps shown in FIG. 2 may be omitted, repeated, and/or performed in a different order than the order shown in FIG. 2. Accordingly, the scope of the present disclosure should not be considered limited to the specific arrangement of steps shown in FIG. 2.

In Step 202, nodes are generated by the analysis engine (104) for the statements of the source code. In one or more embodiments, the source code has been compiled to byte code for the analysis, but code of any level can be analyzed including code stored using high level languages, scripting languages, assembly languages, intermediate representations, and machine languages.

In one or more embodiments, the nodes (e.g., in a supergraph) generated by the analysis engine (104) are generated on demand as each statement is processed. In one or more embodiments, a node is generated for each dataflow fact (e.g., each variable) referenced by each statement that is processed. In other words, a node may be generated for each combination of statement and dataflow fact.

In Step 204, a source node and a sink node are identified. In one or more embodiments, a set of sink nodes and a set of source nodes are each identified in the source code and enumerated in one or more lists. In one or more embodiments, the sink nodes are identified by matching each of the statements in the source code to a list of known sink statements that enumerates all of the possible sink statements in the source code based on the application program interfaces (APIs) used by the source code. In one or more embodiments, the source nodes are identified by matching statements from the source code to a list of known source statements that enumerates all of the possible source statements in the source code based on the APIs used by the source code. In one or more embodiments, the source nodes are identified on demand for each sink node that has been identified by the analysis engine (104).

In Step 206, the source node is determined to be backward reachable from the sink node. In one or more embodiments, the determination is performed by traversing the nodes of the supergraph until an access path associated with the source node matches an access path propagated from the access path associated with the sink node. In one or more embodiments, the access path associated with the sink statement is propagated while traversing the nodes of the supergraph. The propagated access paths may correspond to the flow of values into the variables and/or object fields referenced by the statements in the source code. See description of FIG. 3 below.

In Step 208, a potential taint flow is identified from the source node to the sink node. In one or more embodiments, the source node represents a potential taint source, where external input may be received, for example, from a user or an external program. In one or more embodiments, the potential taint flow is identified by generating the dataflow path through the supergraph between a source node and a sink node. The tainted dataflow path may be stored in a list of taint flows. See description of FIG. 3 below.

Figure 3:
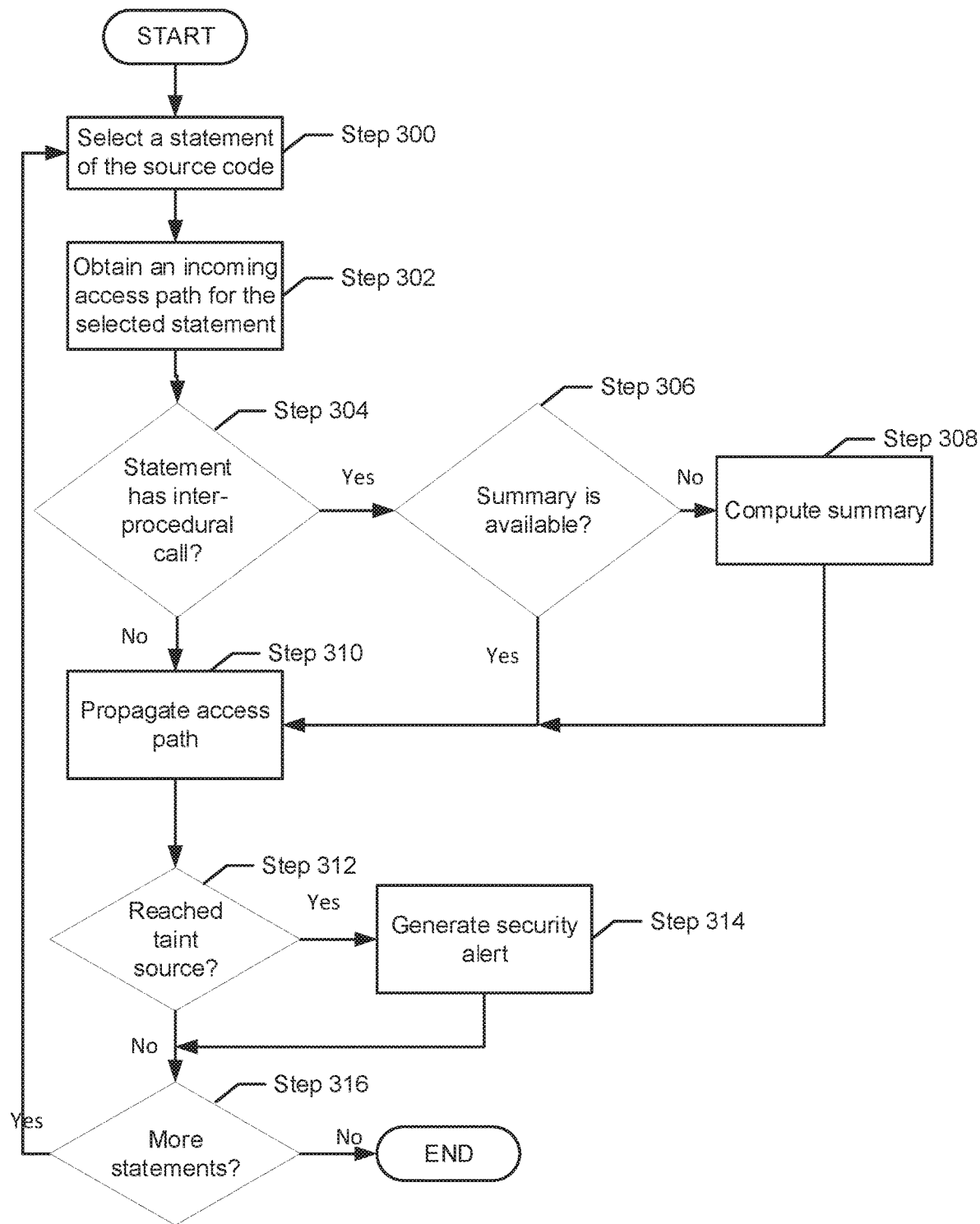
FIG. 3 shows a method for taint analysis in accordance with one or more embodiments of the present disclosure.

FIG. 3 shows a flowchart in accordance with one or more embodiments of the present disclosure. The flowchart of FIG. 3 depicts a process for performing taint analysis on source code. The process can be implemented to operate on computer system (100) of FIG. 1. In one or more embodiments, one or more of the steps shown in FIG. 3 may be omitted, repeated, and/or performed in a different order than the order shown in FIG. 3. Accordingly, the scope of the present disclosure should not be considered limited to the specific arrangement of steps shown in FIG. 3.

Initially, in Step 300, a statement of the source code is selected. After the statement is selected, the supergraph node corresponding to the statement may be partially exploded within the supergraph to include nodes for the variables referred to by the statement. Each of the files of the source code may be analyzed until a sink statement is identified. In one or more embodiments, the next statement to be selected and analyzed is the statement corresponding to a directly preceding node in the supergraph.

In one or more embodiments, a sink statement is the first statement to be analyzed (e.g., the first statement for which an access path is obtained in Step 302 below). The sink statement may correspond to a sink node in the supergraph (see description of Step 204 above). In one or more embodiments, the sink statement is a statement that uses a variable in a security sensitive operation for which the value should not be tainted, such as a function call. The sink statement may be of the form $b.f_1.f_2 \ldots f_n = y$, where $b$ is a base variable, $f_1.f_2 \ldots f_n$ are fields, and $y$ is the value to be stored. In this example, the access path of the sink statement is $b.f_1.f_2 \ldots f_n$.

In Step 302, an incoming access path of the selected statement is obtained. Continuing the example above, the incoming access path may be of the form $b.f_1.f_2 \ldots f_n$, where $b$ is a base variable, and $f_1.f_2 \ldots f_n$ are fields. Alternatively, the incoming access path may be passed in from an earlier iteration of the process described in FIG. 3, as described in Step 316 below.

In Step 304, it is determined whether the statement being analyzed includes an inter-procedural function call. An inter-procedural function call is a call to a function that is outside of the function in which the statement is located. When the statement includes an inter-procedural function call, execution proceeds with Step 306. When the statement does not include an inter-procedural function call, execution proceeds with Step 310.

In Step 306, it is determined whether a summary is available for the inter-procedural call. In one or more embodiments, each summary generated by the analysis engine is stored in a list of summaries. When a summary for the inter-procedural call of the statement being analyzed is not in the list of summaries, then execution proceeds with Step 308 to compute the summary. Otherwise, the summary is available and execution proceeds with Step 312.

In Step 308, a summary for the statement with the inter-procedural function call is computed. In one or more embodiments, the summary is computed by propagating the return value access path of the called function. In one or more embodiments, the propagation simply converts or maps arguments and return values of the function between callers and callees of the function without modifying access paths. Propagating access paths is further described with regards to Step 310 below. After propagating the return value access path from the end of the called function to the beginning of the called function, the process identifies the access paths of the variables through which data may flow through to the return value of the function, and stores the access paths in the summary.

In Step 310, the access path obtained in Step 302 above is propagated. In one or more embodiments, the pseudocode of Table 1 is implemented on a computer system to perform the access path propagation.

TABLE 1

Pseudocode for analyzing intra-procedural flow.
Intra-procedural flow functions

```
1   constant k
2   procedure FLOW(statement,(b.f₁...fₙ))
3     match statement
4       case [[x = new]]                                          (1)
5         if x = b then return ∅
6         else return {(b.f₁...fₙ)}
7       case [[x = y]]                                             (2)
8         if x = b then return {(y.f₁...fₙ)}
9         else return {(b.f₁...fₙ)}
10      case [[x = TaintSource( )]]                                (3)
11        if x = b then return {0}
12        else return {(b.f₁...fₙ)}
13      case [[x = y.g]]                                           (4)
14        if x = b then
15          z.g₁...gₘ ← REIFY((y.g))
16          if m + n > k then return ∅
17          else return {(z.g₁...gₘ.f₁...fₙ)}
18        else return {(b.f₁...fₙ)}
19      case [[x.g = y]]                                           (5)
20        z.g₁...gₘ ← REIFY((x.g))
21        if z = b and m ≤ n and g₁...gₘ = f₁...fₘ then
22          if ∀i ∈ [1,m], gᵢ is not an array then return
              {(y.fₘ₊₁...fₙ)}
23          else return {(y.fₘ₊₁...fₙ),(b.f₁...fₙ)}
24        else return {(b.f₁...fₙ)}
25  procedure REIFY((b.f₁...fₙ))
26    match DEFINITION(b)
27      case b = y.g
```

TABLE 1-continued

Pseudocode for analyzing intra-procedural flow.
Intra-procedural flow functions

| 28 | return REIFY((y.g.$f_1$...$f_n$)) |
| 29 | case default |
| 30 | return (b.$f_1$...$f_n$) |

In one or more embodiments, five cases of flow functions are considered for allocation, assignment, field-load, field-store, and taint-source statements. For each type of statement, the flow function defines which facts (e.g., values of variables), if any, must hold before the statement for a given fact to hold after the execution of the statement. A flow function propagates (e.g., maps) an access path of the form b.$f_1$ . . . $f_n$, where b is the base variable, and $f_1$ . . . $f_n$ is a sequence of fields, to a set of access paths. Inter-procedural call and return flow functions may be omitted because these flow functions simply convert arguments and return values between callers and callees without modifying access paths. The Flow procedure is invoked as statements are processed, to dynamically construct the supergraph (e.g., by adding edges between the nodes of different statements and variables within the supergraph). For each of the Cases 1 through 5 from Table 1, when the incoming access path does not match the propagated access path, the propagated access path is unchanged.

Case 1 in lines 4 through 6 of Table 1 defines the flow function for allocation statements. The incoming access path (i.e., the access path obtained in Step 302 above) is mapped to the empty set (Ø) (i.e., the incoming access path is not propagated) if the base variable b of the incoming access path matches the newly assigned local variable x. This captures the fact that access paths rooted at x cannot exist before x is allocated. Otherwise, the identity function is applied, and the incoming access path is propagated unchanged.

Case 2 in lines 7 through 9 of Table 1 defines the flow function for assignments of the form x=y. The base variable b of the incoming access path is replaced with y in the propagated access path if b matches x.

Case 3 in lines 10 through 12 of Table 1 defines the flow function for assignment of tainted values. If b matches x, the incoming access path is mapped to the null fact (0), to capture the fact that x became tainted at that specific point in the program. When Case 3 is executed, a taint flow may exist between a sink statement (e.g., the sink statement from which the incoming access path was originally derived) and the "source" statement assigning the tainted value.

Case 4 in lines 13 through 18 of Table 1 define the flow functions for loads of the form x=y.g. Case 5 in lines 19 through 24 of Table 1 define the flow functions for stores of the form x.g=y, where x.g is a store access path and y is a stored value. When the algorithm from Table 1 operates on source code represented in an intermediate representation (IR) (e.g., a supergraph) using static single assignment (SSA), statements involving multiple stores and loads are reified (see discussion below). In one or more embodiments, using SSA, the variables represented in the IR may be renamed such that each variable is assigned exactly once, and each variable is defined before it is used. For example, if it is possible to assign a variable x using a value coming from multiple statements of the source code (e.g., due to conditional branches in the source code), then the variable x may be split into versions that are named $x_1$, $x_2$, . . . $x_n$ to correspond with the various ways that x may be assigned a single value (i.e., exactly once). In this way each assignment of the variable x corresponds to its own version $x_i$. In one or more embodiments, requiring that each variable represented be assigned exactly once simplifies the traversal of the supergraph when tracing the flow of values among statements of the source code, since there is a unique dataflow path through the supergraph corresponding to each variable assignment.

Translation to an IR usually deconstructs field accesses into multiple substatements using temporary variables that require reification before analysis. To address this issue, an on-demand, intra-procedural reification step (i.e., the Reify procedure defined in lines 25-30 of Table 1, and described below) is performed before processing any store or load instruction, which determines the full access path referenced by the load or store statement.

Hence, Case 4 defines the flow function for loads of the post-reification form x=z.$g_1$ . . . $g_m$. The base variable b is replaced with z, and the loaded fields $g_1$ . . . $g_m$ are prepended to the incoming access path if b matches x (unless the length of the new, propagated access path exceeds the pre-defined limit k, in which case the empty set is returned).

Case 5 defines the flow function for stores of the post-reification form z.$g_1$ . . . $g_m$=y. The base variable b is replaced with y, and fields $f_1$ . . . $f_m$ are removed from the incoming access path if b matches z and the stored fields $g_1$ . . . $g_m$ match $f_1$ . . . $f_m$ (i.e., the stored fields form a prefix of the incoming access path). If any of the stored fields is an array (i.e., line 22 of Table 1 is true), the incoming access path is also preserved (e.g., the incoming access path is also propagated unchanged) because the analysis is array-insensitive (e.g., the analysis does not analyze the exact array cell that is loaded), and hence cannot invalidate the incoming access path.

The reification step (the Reify procedure) is explained in more detail by way of an example using the code snippet below.
1 tmp1=y.f
2 tmp2=tmp1.g
3 tmp2.h=a
Assume that a is tainted, and that we are computing the flow function of the incoming access path y.f.g.h and the statement "tmp2.h=a" at line 3 of the code snippet. Without reification, Case 5 may wrongly conclude that the statement "tmp2.h=a" has no impact on the incoming access path y.f.g.h since the base variables ('tmp2' of "tmp2.h" and 'y' of "y.f.g.h" do not match). To determine that the store to tmp2.h does, in fact, affect y.f.g.h, the reification step starts by tracking the definition of the base variable of the store/load. If the definition is a load statement, the reification step replaces the base variable of the original store/load with the loaded access path, and starts tracking the definition of the base variable of the loaded access path. This is done recursively until the Reify procedure reaches a definition that is not a load statement. Once the reification step completes, the appropriate flow function can be applied to the reified store/load statement.

Returning to FIG. 3, if, in Step 312, the statement being analyzed is a taint source (e.g., the statement receives input from a user or a program external to the source code), then in Step 314 a security alert is generated (e.g., to alert a user or developer to the potential security threat represented by the taint flow). In one or more embodiments, the security alert includes a trace that identifies the source code statements and the variables associated with the flow of tainted values. For example, the trace may include the source statement, the sink statement, and the intervening statements corresponding to the dataflow path through the supergraph (e.g., the dataflow path corresponding to the flow of tainted values between the source and sink statements).

In Step 316, if it is determined that there are additional statements to analyze in the source code, then Step 300 is again executed for a next statement, whose incoming access path may be an access path propagated during the current iteration of the process described by FIG. 3. The next statement may be the statement in the source code whose execution directly preceded the execution of the current statement being analyzed. For example, as discussed in the description of Step 300 above, statements may be analyzed in reverse execution order within the source code (e.g., tracing backward through the steps of a procedure or function). When there are no more statements to analyze, the process described in FIG. 3 may end.

In one or more embodiments, scalability is enhanced by using the flyweight design pattern so that each access path is created only once in memory and reused as many times as needed, which enhances scalability. In one or more embodiments, speed is enhanced by optimizing away nodes in the exploded supergraph that have only one predecessor and for which the transfer function is the identity function. Because most nodes fall in this category (e.g., most statements have only one predecessor and do not modify tainted access paths), this optimization can speed up the analysis significantly, in the range of 40% to 50% on large programs. In one or more embodiments, speed is enhanced by a k-limiting approach that favors precision (and hence scalability, as fewer potential taint flows are explored), by ignoring any taint flows involving access paths exceeding a constant k. In one or more embodiments, k is at least 1 and may be selected as 5.

In one or more embodiments, the taint analysis in accordance with the disclosure omits computing complete aliasing information, which would require an interplay between a backward taint analysis and a forward alias propagation analysis. This deliberate trade-off of soundness for scalability drastically reduces the theoretical complexity. The complexity is reduced from being a Distributive problem with complexity $O(ED^3)$ for traditional methods to being an h-sparse problem with complexity $O(Call\ D^3+hED^2)$ for embodiments in accordance with the disclosure, where Call is the number of call sites, D is the dataflow domain, E is the set of intra-procedural edges, and $h<<|D|$.

FIGS. 4A and 4B show an example analysis of source code in accordance with one or more embodiments of the present disclosure. In one or more embodiments, the analysis can be presented in a user interface (400) that is displayed by the computer system ((100) in FIG. 1), which may correspond to the computing system shown in FIGS. 5A and 5B. In one or more embodiments, one or more of the features shown in FIGS. 4A and 4B may be omitted, repeated, and/or altered as shown from FIGS. 4A and 4B. Accordingly, the scope of the present disclosure should not be considered limited to the specific arrangement of features shown in FIGS. 4A and 4B.

The user interface (400) includes a set of rows and a set of columns. The set of columns includes line columns (402, 408), a code column (404), a comment column (406), and a graph column (410).

The line columns (402, 408) identify the line number in the file that contains the source code ((106) in FIG. 1) for the statements ((110) in FIG. 1) presented in the code column (404). The code column (404) displays the source code statements of a file from the repository ((102) in FIG. 1) that has been analyzed. The comment column (406) displays a set of comments that are associated with the source code and provide feedback regarding the analysis. The comments identify the access paths being propagated, the use of summary functions, and the sequence in which statements are analyzed. The graph column (410) displays at least a subset of the supergraph ((108) in FIG. 1) generated for the source code. The dashed arrows (412) in the graphs in the graph column (410) of FIG. 4B identify transitions based on inter-procedural calls or statements and the solid arrows (414) identify transitions based on intra-procedural calls or statements.

For the example provided, which does not limit the scope of the invention, Lines 24 through 34 define a function ("foo") that is analyzed in reverse execution order. The analysis begins at source code Line 33, which is shown in FIG. 4A. In Line 33 of FIG. 4A, the source code displayed in the code column (404) ("sink(boxData);") is a call to a function named "sink" that is identified with a sink statement that operates on potentially tainted data. The potentially tainted data is from the variable named "boxData". The comment displayed in the comment column (406) identifies that this as the first step in the analysis and that the access path for the boxData variable is being analyzed to determine if tainted data can reach the sink statement from a source statement. The analysis begins at Line 33 and ends at Line 25.

In Line 32 of FIG. 4A, the source code includes an inter-procedural function call that necessitates computing a summary for the "get" method, defined in Lines 9 through 12, whose result is assigned to the boxData variable.

Lines 9 through 12 of FIG. 4A define a function ("get") of a class ("Box"). The function is analyzed in reverse execution order. The statement in Line 11 ("return str;") is analyzed under Case 2 of Table 1, where the incoming access path {<ret>} is replaced with the base variable "str". Next, the statement in Line 10 is analyzed under Case 4, where the incoming access path "str" is replaced with the access path this.f, which accesses a field "f" of the instantiated object "this" used to call the function. In Line 9, the comments in the comment column (406) indicate that the summary of the get function maps the return value ("<ret>") to the "this.f" access path.

In Lines 31 and 32, the comments indicate that the access path being propagated has changed from "boxData" to "box2.f", which was determined using the summary of the "get" method when invoked on the object "box2" (also displayed by a dashed arrow (412) in FIG. 4B). After computing the summary of the get function, the analysis proceeds back to Line 30 where the next statement to be analyzed is located.

In Line 30 of FIG. 4A, the source code includes an inter-procedural function call that necessitates computing a summary for the copy function defined in Lines 15 through 22.

Lines 15 through 22 of FIG. 4A define a function ("copy"). The function is analyzed in reverse execution order. The statement in Line 21 ("return cpy;") is analyzed under Case 2 of Table 1. The statement in Line 20 contains an inter-procedural function call to the put function of the Box class, for which the summary is to be calculated.

Lines 4 through 6 of FIG. 4A define the put function of the Box class. The function is analyzed in reverse execution order. The statement in Line 5 ("this.f=str;") is analyzed under Case 5 of Table 1. In Line 4, the comments in the comment column (406) indicate that the summary of the put function maps a field access path ("this.f") to the access path for the input argument ("arg0") of the put function.

After computing the summary of the put function, the analysis proceeds back to Line 18 to analyze the next statement. In Line 20, the comment in the comment column (406) indicates that the access path being propagated has changed from "cpy.f" to "data".

In Line 18 of FIG. 4A, the summary for the get function is reused to analyze the statement ("String data=box.get( )") in the code column (404). The comment in the comment column (406) for Line 18 indicates that the access path being propagated has changed from "data" to "box.f". The analysis proceeds to Line 16 for the next statement to analyze.

In Line 16 of FIG. 4A, the statement ("Box cpy=new Box( );") is analyzed under Case 1 of Table 1. There is no change to the access path being propagated and the analysis precedes to Line 15.

In Line 15 of FIG. 4A, the summary has been completed. The comments in the comment column (406) indicate that the propagated access path ("box.f") is mapped to the access path of the input variable ("arg0.f").

After computing the summary for the copy function, the analysis proceeds to Line 29 and then to Line 28 where the next statement to be analyzed is located. In Line 30, the comment indicates that the access path being propagated has changed from "box2.f" to "box1.f".

In Line 28 of FIG. 4A, the source code includes an inter-procedural function call that reuses the summary calculated for the put method defined in Lines 4 through 6. The summary for the put method was generated during the analysis of the copy method. After using the summary, the analysis proceeds to Line 27 and then to Line 26 where the next statement to be analyzed is located. In Line 28, the comment indicates that the access path being propagated has changed from "box1.f" to "tainted".

In Line 26 of FIG. 4A, the source code includes an intra-procedural statement (i.e., a statement that does not include an inter-procedural function call). The intra-procedural statement is analyzed under Case 1 of Table 1. Since the base variables do not match, there is no change to the access path ("tainted") that is being propagated. The analysis then proceeds to line 25.

In Line 25 of FIG. 4A, the source code includes an intra-procedural statement that is analyzed under Case 3 of Table 1. Since the base variables match and the function is identified as a source function, the access path ("tainted") that is being propagated is updated to the null fact, which indicates that the source statement ("getTainted") in Line 25 is backward reachable from the sink statement in Line 33. At this point in the analysis, an alert is generated by the alert generator ((124) in FIG. 1) to identify the possible flow of tainted data between the source statement in Line 25 and the sink statement in Line 33.

Figure 5A:
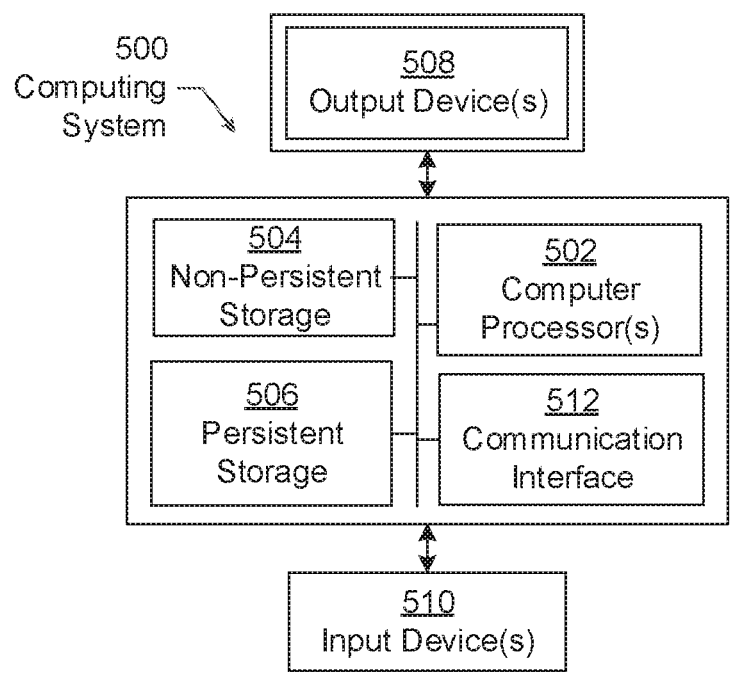
FIGS. 5A and 5B show a computing system in accordance with one or more embodiments of the present disclosure.

Embodiments of the invention may be implemented on a computing system. Any combination of mobile, tablet, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
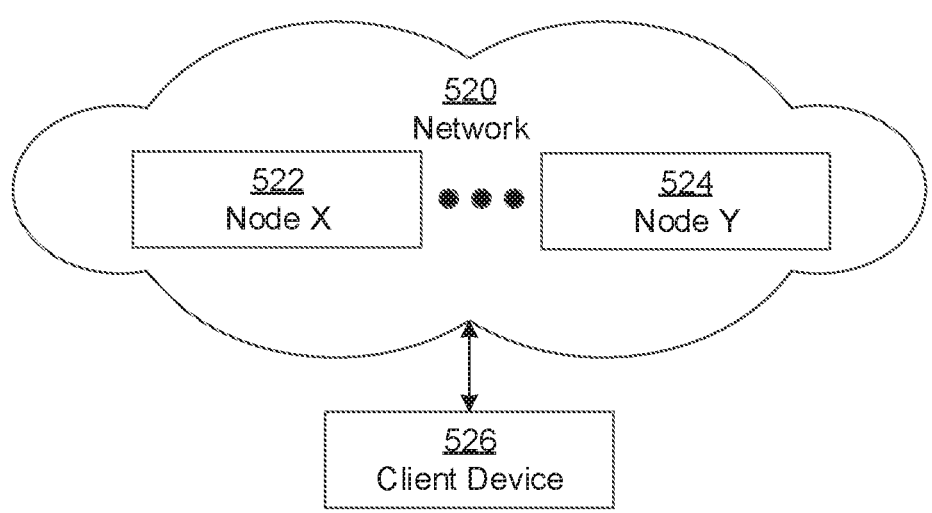

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, which may be in accordance with the extensible markup language (XML) standard).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine any combination of A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various widgets and elements that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method being executed on a processor, the method comprising:
   generating, for source code, a supergraph comprising a set of nodes for a set of statements comprising a first statement and a second statement,
      wherein the supergraph is generated from control flow graph nodes of a control flow graph with as many exploded nodes as dataflow facts exist to form the set of nodes from the exploded nodes, and
      wherein each node of the set of nodes comprises a dataflow fact and a statement of the set of statements;
   identifying a source node and a sink node of the set of nodes;
   identifying an incoming access path comprising a base variable and a set of fields;
   determining that the source node is backward reachable from the sink node by analyzing the incoming access path; and in response to the determination, identifying a potential taint flow from the source node to the sink node.

2. The method of claim 1, further comprising: generating a security alert.

3. The method of claim 2, wherein the security alert indicates that the source code is susceptible to one of a structured query language (SQL) injection attack and a cross site scripting (XSS) attack.

4. The method of claim 1,
wherein the source node corresponds to the second statement,
wherein the sink node corresponds to the first statement,
wherein the source node is backward reachable from the sink node via a dataflow path through the supergraph, and
wherein the dataflow path includes a number of store statements, load statements, assignment statements, function calls, and function returns.

5. The method of claim 1, wherein determining whether the source node is backward reachable comprises:
computing a summary when a statement of a node of the set of nodes comprises an inter-procedural call, wherein the statement corresponds to the incoming access path; and
analyzing the statement when the statement does not comprise an inter-procedural call.

6. The method of claim 5, wherein analyzing the statement comprises:
when the statement is an allocation statement, not propagating the incoming access path,
when the statement is an assignment statement, replacing the base variable of the incoming access path with a second base variable to which a value is assigned by the statement,
when the statement is an assignment statement associated with the source node, replacing the incoming access path with a symbol indicating the presence of potentially tainted data,
when the statement is a load statement, prepending, to the incoming access path, a field of an access path associated with the load statement and replacing the base variable of the incoming access path with a third base variable of an access path of the load statement, and
when the statement is a store statement with a store access path matching a prefix of the incoming access path, replacing the prefix with the stored value.

7. A system comprising:
a memory, coupled to a processor, comprising a repository comprising:
source code comprising a set of statements comprising a first statement and a second statement; and
a supergraph comprising a set of nodes,
wherein the supergraph is generated from control flow graph nodes of a control flow graph with as many exploded nodes as dataflow facts exist to form the set of nodes from the exploded nodes, and
wherein each node of the set of nodes comprises a dataflow fact and a statement of the set of statements; and
an access path propagator executing on the processor and using the memory, configured to:
generate the set of nodes for the set of statements;
identify a source node and a sink node of the set of nodes;
identify an incoming access path comprising a base variable and a set of fields;
determine that the source node is backward reachable from the sink node by analyzing the incoming access path; and
in response to the determination, identify a potential taint flow from the source node to the sink node.

8. The system of claim 7, further comprising an alert generator executing on the processor configured to:
generate a security alert.

9. The system of claim 8, wherein the security alert indicates that the source code is susceptible to one of a structured query language (SQL) injection attack and a cross site scripting (XSS) attack.

10. The system of claim 7,
wherein the source node corresponds to the second statement,
wherein the sink node corresponds to the first statement, and
wherein the source node is backward reachable from the sink node via a dataflow path through Flail the supergraph, and
wherein the dataflow path includes a number of store statements, load statements, assignment statements, function calls, and function returns.

11. The system of claim 7, further comprising a summarizer executing on the processor and using the memory, configured to:
compute a summary when a statement of a node of the set of nodes comprises an inter-procedural call, wherein the statement corresponds to the incoming access path; and
analyze the statement when the statement does not comprise an inter-procedural call.

12. The system of claim 11, wherein the access path propagator is further configured to:
when the statement is an allocation statement, not propagate the incoming access path,
when the statement is an assignment statement, replace the base variable of the incoming access path with a second base variable to which a value is assigned by the statement,
when the statement is an assignment statement associated with the source node, replace the incoming access path with a symbol indicating the presence of potentially tainted data,
when the statement is a load statement, prepend, to the incoming access path, a field of an access path associated with the load statement and replace the base variable of the incoming access path with a third base variable of an access path of the load statement, and
when the statement is a store statement with a store access path matching a prefix of the incoming access path, replace the prefix with the stored value.

13. A non-transitory computer readable medium comprising computer readable program code for:
generating, for source code, a supergraph comprising a set of nodes for a set of statements comprising a first statement and a second statement,
wherein the supergraph is generated from control flow graph nodes of a control flow graph with as many exploded nodes as dataflow facts exist to form the set of nodes from the exploded nodes, and
wherein each node of the set of nodes comprises a dataflow fact and a statement of the set of statements;
identifying a source node and a sink node of the set of nodes;

determining that the source node is backward reachable from the sink node by analyzing an incoming access path; and in response to the determination, identifying a potential taint flow from the source node to the sink node.

14. The non-transitory computer readable medium of claim 13, further comprising computer readable program code for:

generating a security alert.

15. The non-transitory computer readable medium of claim 14, wherein the security alert indicates that the source code is susceptible to one of a structured query language (SQL) injection attack and a cross site scripting (XSS) attack.

16. The non-transitory computer readable medium of claim 13, wherein the source node corresponds to the second statement, wherein the sink node corresponds to the first statement, wherein the source node is backward reachable from the sink node via a dataflow path through the supergraph, and wherein the dataflow path includes a number of store statements, load statements, assignment statements, function calls, and function returns.

17. The non-transitory computer readable medium of claim 13, wherein the computer readable program code for determining whether the source node is backward reachable further comprises computer readable program code for:

computing a summary when a statement of a node of the set of nodes comprises an inter-procedural call, wherein the statement corresponds to the incoming access path; and analyzing the statement when the statement does not comprise an inter-procedural call.

18. The non-transitory computer readable medium of claim 17, wherein the computer readable program code for analyzing the statement further comprises computer readable program code for:

when the statement is an allocation statement, not propagating the incoming access path, when the statement is an assignment statement, replacing the base variable of the incoming access path with a second base variable to which a value is assigned by the statement, when the statement is an assignment statement associated with the source node, replacing the incoming access path with a symbol indicating the presence of potentially tainted data, when the statement is a load statement, prepending, to the incoming access path, a field of an access path associated with the load statement and replacing the base variable of the incoming access path with a third base variable of an access path of the load statement, and when the statement is a store statement with a store access path matching a prefix of the incoming access path, replacing the prefix with the stored value.

* * * * *

UNITED STATES PATENT AND TRADEMARK OFFICE
CERTIFICATE OF CORRECTION

PATENT NO. : 10,789,362 B2
APPLICATION NO. : 16/050160
DATED : September 29, 2020
INVENTOR(S) : Nicholas Allen et al.

It is certified that error appears in the above-identified patent and that said Letters Patent is hereby corrected as shown below:

In the Claims

Claim 10, Column 18, Line 19, the word "Flail", between the words "through" and "the", should be removed.

Signed and Sealed this
Fifteenth Day of December, 2020

Andrei Iancu
*Director of the United States Patent and Trademark Office*